(12) United States Patent
Arcangeli et al.

(10) Patent No.: US 12,045,474 B2
(45) Date of Patent: Jul. 23, 2024

(54) EFFICIENT DIRTY PAGE EXPIRATION

(71) Applicant: Red Hat, Inc., Raleigh, NC (US)

(72) Inventors: Andrea Arcangeli, New York, NY (US); Giuseppe Scrivano, Pezzano della Sila (IT); Michael Tsirkin, Haifa (IL)

(73) Assignee: Red Hat, Inc., Raleigh, NC (US)

( * ) Notice: Subject to any disclaimer, the term of this patent is extended or adjusted under 35 U.S.C. 154(b) by 12 days.

(21) Appl. No.: 17/392,031

(22) Filed: Aug. 2, 2021

(65) Prior Publication Data

US 2023/0032137 A1    Feb. 2, 2023

(51) Int. Cl.
*G06F 12/00* (2006.01)
*G06F 3/06* (2006.01)
*G06F 13/00* (2006.01)

(52) U.S. Cl.
CPC .......... *G06F 3/0631* (2013.01); *G06F 3/0604* (2013.01); *G06F 3/0635* (2013.01); *G06F 3/0659* (2013.01); *G06F 3/067* (2013.01); *G06F 3/0683* (2013.01)

(58) Field of Classification Search
CPC .... G06F 3/0631; G06F 3/0604; G06F 3/0635; G06F 3/0659; G06F 3/067; G06F 3/0683
USPC ........................................................ 711/154
See application file for complete search history.

(56) References Cited

U.S. PATENT DOCUMENTS

| | | | | |
|---|---|---|---|---|
| 5,418,973 A * | 5/1995 | Ellis | ...................... | G06F 15/8069 711/3 |
| 5,440,686 A * | 8/1995 | Dahman | .............. | G11B 27/002 711/158 |
| 5,530,933 A * | 6/1996 | Frink | ................... | G06F 12/0831 711/119 |
| 5,892,937 A | 4/1999 | Caccavale | | |
| 6,101,582 A * | 8/2000 | Arimilli | .............. | G06F 12/0833 711/146 |
| 6,434,639 B1 * | 8/2002 | Haghighi | ............ | G06F 12/0831 710/39 |
| 8,271,737 B2 | 9/2012 | Chen et al. | | |
| 8,607,015 B2 * | 12/2013 | Miyata | ................... | G11B 19/02 711/E12.001 |
| 9,229,870 B1 * | 1/2016 | Kumar | ................ | G06F 12/0868 |
| 9,569,180 B1 * | 2/2017 | Jiang | ................... | G06F 9/45558 |
| 9,588,901 B2 * | 3/2017 | Chahal | ................... | G06F 3/0685 |
| 9,880,764 B1 * | 1/2018 | Xu | ........................ | G06F 3/0617 |
| 9,880,773 B2 * | 1/2018 | Rajani | ................. | G06F 9/45558 |
| 9,959,280 B1 * | 5/2018 | Whitehead | .............. | G06F 16/13 |

(Continued)

OTHER PUBLICATIONS

Hou, Binbing et al., Pacaca: Mining Object Correlations and Parallelism for Enhancing User Experience with Cloud Storage, IEEE, Sep. 2018, 13 pages.

*Primary Examiner* — Sheng Jen Tsai
(74) *Attorney, Agent, or Firm* — Womble Bond Dickinson (US) LLP (57) ABSTRACT

Systems and methods providing efficient dirty memory page expiration. In one implementation, a processing device may identify a storage device. The processing device may determine a value of an indicator associated with the storage device. The indicator may indicate a level of consistency between a volatile memory device and a non-volatile memory device of the storage device. In view of the value of the indicator, the processing device may modify a synchronization timeout value associated with the volatile memory device.

18 Claims, 4 Drawing Sheets

(56) References Cited

U.S. PATENT DOCUMENTS

| | | | |
|---|---|---|---|
| 10,021,696 B2 | 7/2018 | Kalmbach et al. | |
| 10,366,002 B2* | 7/2019 | Atkisson | G06F 13/28 |
| 10,402,394 B2* | 9/2019 | Pendharkar | G06F 9/45558 |
| 10,592,160 B1* | 3/2020 | Vaidya | G06F 3/0619 |
| 10,990,365 B2* | 4/2021 | Burgazzoli | G06F 8/433 |
| 11,106,455 B2* | 8/2021 | Myers | G06F 9/45558 |
| 11,487,878 B1* | 11/2022 | Zhang | G06F 9/5077 |
| 11,650,810 B1* | 5/2023 | Wang | G06F 8/73 717/148 |
| 2005/0204099 A1* | 9/2005 | Morrow | G06F 12/0857 711/143 |
| 2007/0083718 A1* | 4/2007 | Okabayashi | G06F 12/126 711/143 |
| 2007/0156964 A1* | 7/2007 | Sistla | G06F 12/121 711/E12.07 |
| 2007/0282929 A1* | 12/2007 | Kobayashi | G06F 11/1461 |
| 2008/0189484 A1* | 8/2008 | Iida | G06F 12/0804 713/340 |
| 2009/0055591 A1* | 2/2009 | Miwa | G06F 12/0897 711/143 |
| 2009/0077312 A1* | 3/2009 | Miura | G06F 11/1441 711/E12.019 |
| 2011/0061001 A1* | 3/2011 | Jones | G06Q 30/02 715/744 |
| 2011/0208914 A1* | 8/2011 | Winokur | G06F 12/0804 711/119 |
| 2011/0219208 A1* | 9/2011 | Asaad | G06F 9/06 712/12 |
| 2011/0252192 A1* | 10/2011 | Busch | G06F 16/23 711/E12.016 |
| 2011/0258391 A1* | 10/2011 | Atkisson | G06F 12/0804 711/E12.017 |
| 2011/0283045 A1* | 11/2011 | Krishnan | G06F 9/544 711/E12.008 |
| 2014/0201466 A1* | 7/2014 | Blaner | G06F 12/0831 711/144 |
| 2014/0201467 A1* | 7/2014 | Blaner | G06F 12/0831 711/146 |
| 2014/0201468 A1* | 7/2014 | Blaner | G06F 12/0804 711/146 |
| 2014/0325169 A1* | 10/2014 | Iyigun | G06F 3/0611 711/162 |
| 2015/0205688 A1* | 7/2015 | Haid | G06F 11/2097 709/212 |
| 2015/0253841 A1 | 9/2015 | Xian et al. | |
| 2016/0246724 A1* | 8/2016 | Boehm | G06F 11/3037 |
| 2017/0034297 A1* | 2/2017 | Waheed | H04L 43/0817 |
| 2017/0068618 A1* | 3/2017 | Akiyama | G06F 12/0871 |
| 2017/0293558 A1* | 10/2017 | Guthrie | G06F 12/0842 |
| 2017/0337136 A1* | 11/2017 | Basu | G06F 12/0837 |
| 2018/0349292 A1* | 12/2018 | Tal | G06F 12/123 |
| 2019/0163628 A1* | 5/2019 | Wang | G06F 12/0246 |
| 2019/0266101 A1* | 8/2019 | Robinson | G06F 12/1063 |
| 2020/0272440 A1* | 8/2020 | Burgazzoli | G06F 8/36 |
| 2020/0409778 A1* | 12/2020 | Abe | G06F 11/0772 |
| 2021/0011822 A1* | 1/2021 | Daida | G06F 3/0659 |
| 2021/0019163 A1* | 1/2021 | Taylor | G06F 9/4406 |
| 2022/0066931 A1* | 3/2022 | Ray | G06F 7/575 |

* cited by examiner

EFFICIENT DIRTY PAGE EXPIRATION

TECHNICAL FIELD

The present disclosure is generally related to virtualization systems, and more particularly, to efficient dirty page expiration.

BACKGROUND

A computer system typically includes a hierarchy of memory that ranges from small, fast volatile main memory to a larger, but slower auxiliary memory, such as a non-volatile storage device. In order to avoid data loss, operating systems maintain consistency between data stored in the volatile memory and non-volatile storage device using a number of synchronization techniques. For example, the operating system may maintain consistency by writing data from the volatile main memory to non-volatile storage device based on access time of the memory pages, and/or based on a predefined timeout value associated with memory pages (e.g., every 30 seconds). By maintaining a variety of consistency checkpoints within the storage device, the operating system can strike a balance between storing volatile data to the storage device too often (which can consume a large amount of computing resources unnecessarily), and keeping data in volatile too long (which can lead to data loss, e.g., in the event of an unexpected power loss). These consistency checkpoints are implemented system-wide.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Implementations of the disclosure are directed to providing efficient dirty page expiration. Dirty pages can be described as volatile memory pages that have not been written to storage. Some dirty memory pages may contain temporary data that may not need to be written to storage (e.g., data that will overwritten quickly, or that does not need to be recovered in the event of an unexpected data loss), while other dirty memory pages may contain data that is to be written to storage (e.g., data that does need to recovered in the event of an unexpected system failure). Operating systems (OS) can manage expiration of dirty pages in a variety of ways. For example, an OS may use timeout values to determine when to write dirty memory pages to storage. In one example, an OS may implement a file system that associates each file and directory with an index node (inode).

"Index node" or "inode" refers to a data structure associated with a file system object (e.g., a file or a directory). An inode representing a file system object may comprise one or more identifiers of physical locations (e.g., disk blocks or pages) that store the contents of the file system object. An inode may further comprise various attributes of the file system object, including manipulation metadata (e.g., file creation, access, and/or modification time), as well as owner and permission metadata (e.g., group identifier, user identifier, and/or permissions). An inode may be identified by its number. In certain implementations, a plurality of inodes may be stored in an inode table residing in a known physical location on a storage device. The inode table may be indexed by the inode numbers, so that a file system driver may access the inode associated with a given file and retrieve the identifier of the file physical location and/or file metadata. Alternatively, instead of implementing an inode table, certain file systems may store equivalent data in various other data structures.

An OS implementing a file system that associates each file and directory with an inode may use a timeout that writes dirty memory pages of a particular inode in the file system to storage if there have not been any changes to the pages referenced by the Mode for a predetermined amount of time (e.g., a certain number of centiseconds). The OS may also use another timeout that writes dirty memory pages of referenced by an inode to the storage after a predetermine amount of time (e.g., a certain number of seconds), regardless of whether there have been changes to the pages referenced by the inode.

The first timeout can help prevent temporary data that is quickly overwritten to be written to storage, while the second timeout can help prevent data that is stored in an ever-changing inode from not being written to storage. That is, the first timeout, which waits until the inode has not experienced any changes for a certain number of centiseconds before writing the dirty memory pages to storage, can help keep the number of input/output operations per second (IOPS) low. It does so by avoiding writing temporary data to storage. Temporary data can include data that will be overwritten by the operating system quickly (i.e., before the expiration of the first timeout value). Such data does not need to be written to storage. The second timeout value, on the other hand, ensures that data that is written to an inode that is continuously being changed does eventually get written to storage. For example, the OS can maintain an access time log in the metadata of the inode. The access time records when a file was last accessed (e.g., the time since a file was last read). Quick, successive read operations performed on a particular inode can prevent the memory page from being written to storage, even if the memory page has not been modified within the first timeout value. That is, a memory page in an inode can be kept dirty by successive read operations, which results in successive writes to the inode's access time. In the event of an unexpected shutdown (e.g., an unexpected power loss event), the data written in the dirty memory pages that have been written to storage can be lost.

The second timeout can help prevent such data loss by writing dirty memory pages to storage after a certain number of seconds, regardless of when the memory pages were last updated. The disadvantage with this timeout is that temporary data can be written to storage unnecessarily. Since writing data to storage can use more resources and take more time than keeping data in memory, operating systems use these two timeouts to strike a balance between safety (e.g., avoid losing data in ever-changing memory pages), and unnecessarily writing data to storage. Operating systems can include additional timeouts other than those described above.

While these timeout values can be modified, the modified values are implemented system-wide. However, some operations within an operating system can benefit from timeout values that differ from the system-wide values. Some operations can generate a large quantity of data that do not require consistency in case of a system crash or unexpected shutdown. For example, in a container-based environment, a build container can be used to create an application image in a host computer system. As part of building an application using a build container, a large quantity of data is generated that is discarded once the image is complete. This data is volatile; that is, in the event of an unexpected power loss or a system crash, the data is discarded and the build process is restarted from the beginning. The process does not restart from where it left off, and hence the temporary data generated during the building process does not need to be stored in non-volatile memory. Hence, storing temporary data to non-volatile memory according to the two timeout values describe above can unnecessarily consume computer resources which can slow the building process.

This unnecessary consumption of resources is exacerbated when executed in a cloud environment. Writing data to storage can be a resource-heavy operation. Many cloud execution environments can limit the number of IOPS executed by a node operating in the cloud in order to distribute resources among all nodes in the cloud environment. Many cloud execution environments throttle I/O operations executed by a particular node to keep the node's operations within its allocated bandwidth. In the example above, when a node is executing a build container to generate an application image using traditional data storage timeout values, the temporary data generated by the build process can create a high number of unnecessary write operations written to the storage device (the write operations are unnecessary since they are storing temporary data that will be erased once the application image is built and stored). This high number of write operations can cause the cloud execution environment to throttle the I/O operations, and can even cause the host system to freeze. Thus, generating an application image can take an unnecessarily long time when executed in a cloud environment using the conventional dirty page synchronization timeout values.

Aspects of the present disclosure address the above noted and other deficiencies by providing a new type of storage that does not guarantee consistency in the event of a system crash (e.g., an unexpected power loss event). In some embodiments, a system can receive an instruction to mount a storage device. In some embodiments, the storage device can be associated with a build container in a cloud execution environment. The storage device can be a new class of storage in which consistency between a volatile memory and a non-volatile memory device is not guaranteed. The instruction can include an indicator that indicates that the storage device to be mounted does not require consistency between the volatile memory and the non-volatile memory device. That is, the data that is generated within the new class of storage volatile, and hence can be kept in volatile memory indefinitely and does not need to written to a non-volatile memory device.

The new class of storage can adjust and/or disable the synchronization timeout values associated with the volatile memory device. The synchronization timeout values can indicate a rate at which the system stores memory pages from the volatile memory device to the non-volatile storage device. For example, the synchronization timeout values can include an access time expiration, which writes data from volatile memory to non-volatile memory once a set of amount of time has elapsed since the data was last accessed. Additionally or alternatively, the synchronization timeout values can include a timestamp expiration, which writes data from volatile memory to non-volatile memory every set amount of time (e.g., every 3 seconds). The system can set the value of the access time expiration synchronization timeout and/or the timestamp expiration synchronization timeout to a high value (e.g., to the highest value possible for the data field storing the value). In some embodiments, the system can disable one or both synchronization timeouts entirely. In some embodiments, the system can determine to write a share of the memory pages of the volatile memory device to the non-volatile device responsive to determining that the volatile memory device has reached a threshold capacity.

Aspects of the present disclosure present advantages over conventional solutions to the issues noted above. By keeping temporary data in volatile memory, implementations of the present disclosure avoid the unnecessary I/O operations associated with storing temporary data to non-volatile memory device. When executed in conjunction with a build container, this new type of storage can improve execution time of the build container and thus reduce latency associated with building the container image. Improving execution time of the build container reduces the chances of a system freezing when executed in a cloud environment, thus improving the overall system.

Figure 1:
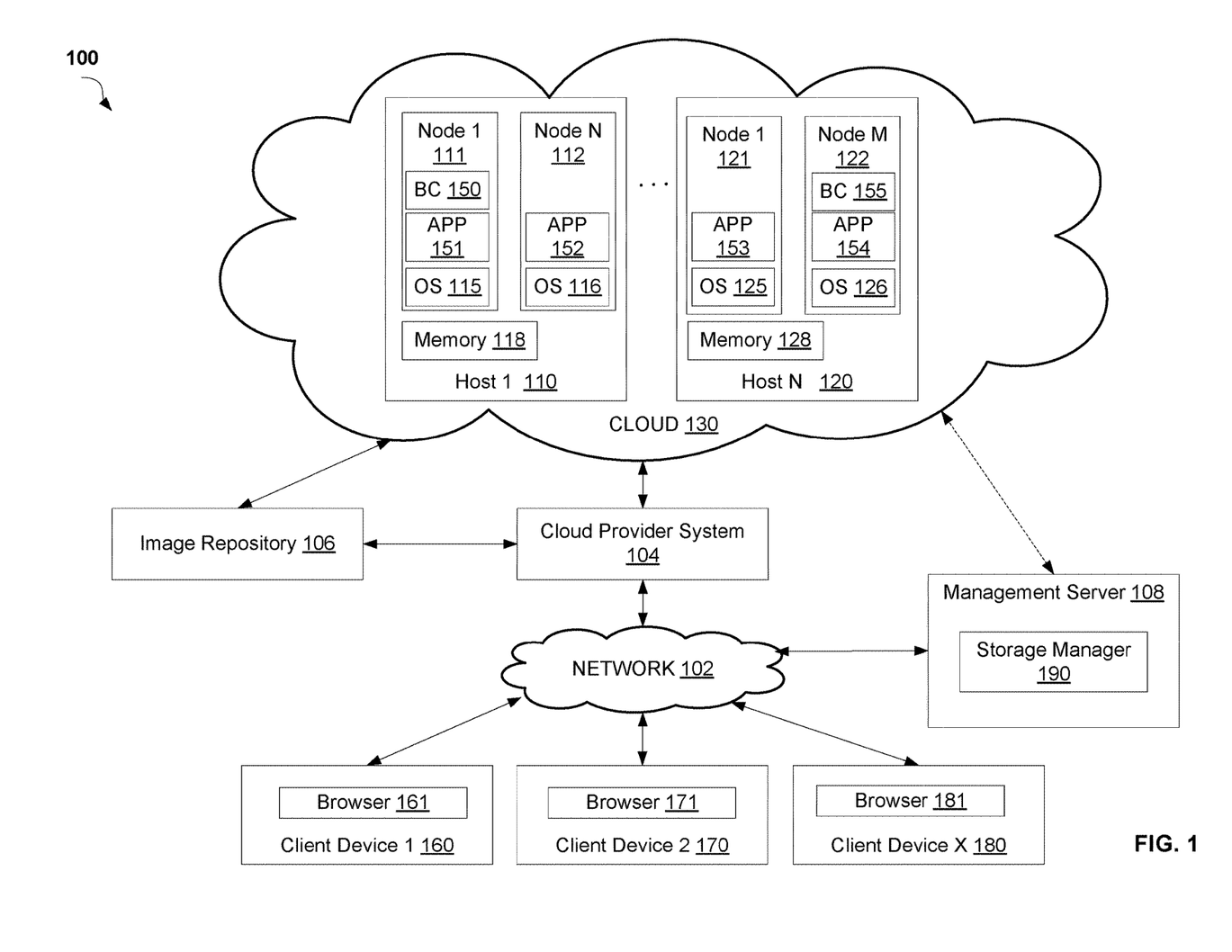
FIG. 1 depicts a block diagram of an example computer system architecture operating in accordance with one or more aspects of the present disclosure.

FIG. 1 is a block diagram of a computer system 100, in which embodiments of the present disclosure may operate. The network architecture 100 may include one or more clouds (networks of computing resources) 130, managed by cloud provider system 104. There may be any number of clouds 130 and cloud provider systems 104. The cloud provider system 104 provides nodes 111, 112, 121, 122 to execute software and/or other processes. In some implementations, the host machines 110, 120 are located in a data center. For example, nodes 111 and 112 are hosted on host machine 110 in cloud 130 provided by cloud provider system 104. Each host machine 110, 120 may include a hypervisor (not shown). When nodes 111, 112, 121, 122 are implemented as VMs, they may be executed by operating systems (OS) 115, 116, 125, 126, respectively. There may be any number of nodes 111, 112, 121, 122 being deployed in a cloud 130.

Users can interact with applications executing on the cloud-based nodes 111, 112, 121, 122 using client computer systems, such as client devices 160, 170 and 180, via corresponding web browser applications 161, 171 and 181, respectively. Client devices 160, 170, and 180 are connected to host machines 110, 120 in cloud 130 and the cloud provider system 104 via a network 102, which may be a private network (e.g., a local area network (LAN), a wide area network (WAN), intranet, or other similar private networks) or a public network (e.g., the Internet). Each client device 160, 170, 180 may be a mobile device, a PDA, a laptop, a desktop computer, a tablet computing device, a server device, or any other computing device. Each host machine 110, 120 may be a server computer system, a desktop computer or any other computing device. The cloud provider system 104 may include machines such as server computers, desktop computers, etc.

In one implementation, the cloud provider system 104 is coupled to a management server 108 via the network 102.

The management server 108 may include a storage manager 190, which may reside on the same machine or different machines (e.g., server computers, desktop computers, etc.). The management server may be maintained by a cloud consumer of cloud 130, such as an enterprise (e.g., business, company, organization, etc.). In another embodiment, the management server 108 may be maintained by a third party cloud provider. In yet another embodiments, the management server 108 may be part of the cloud provider system 104. reside on machines (e.g., server computers, desktop computers, etc.) and may manage the execution of applications in the cloud 130.

The management server 108 may manage the storage devices associated with the cloud 130. In some embodiments, a client device 160, 170, 180 can send an instruction to execute an application 151-154. Application 151, 154 may include a build container that is used to create an application image. The application image (or an image) refers to data (e.g., binaries) representing executables and files of an application used to deploy functionality for a runtime instance of the application. The application image, once built, can be stored in image repository 106.

In embodiments, the cloud provider system 104 can intercept the instruction to execute an application and transmit the instruction to one of host 110, 120 of cloud 130. Host 110, 120 can generate build container (BC) 150, 155. In embodiments, the cloud provider system 104 can determine that the instruction is associated with a particular class of storage. For example, the instruction can include an indicator indicating the particular storage device. The cloud provider system 104 can send a command to the management server 108 to implement the storage device indicated in the instruction.

To implement the storage device associated with the instruction, the management server 108 can execute the storage manager 190. Storage manager 190 can modify the synchronization timeout values associated with the instruction to mount the storage device associated with the build container 150, 155. The storage manager 190 can modify and/or disable one or more of the synchronization timeout values associated with the build container 150, 155. The synchronization timeout values determine when to synchronize data stored in volatile memory 118, 128 of host 110, 120 (respectively) with a non-volatile memory device. Synchronizing data stored in volatile memory 118, 120 to non-volatile memory can include writing dirty pages in memory 118, 120 to a non-volatile memory device. The storage manager 190 is further described with respect to FIG. 2.

Figure 2:
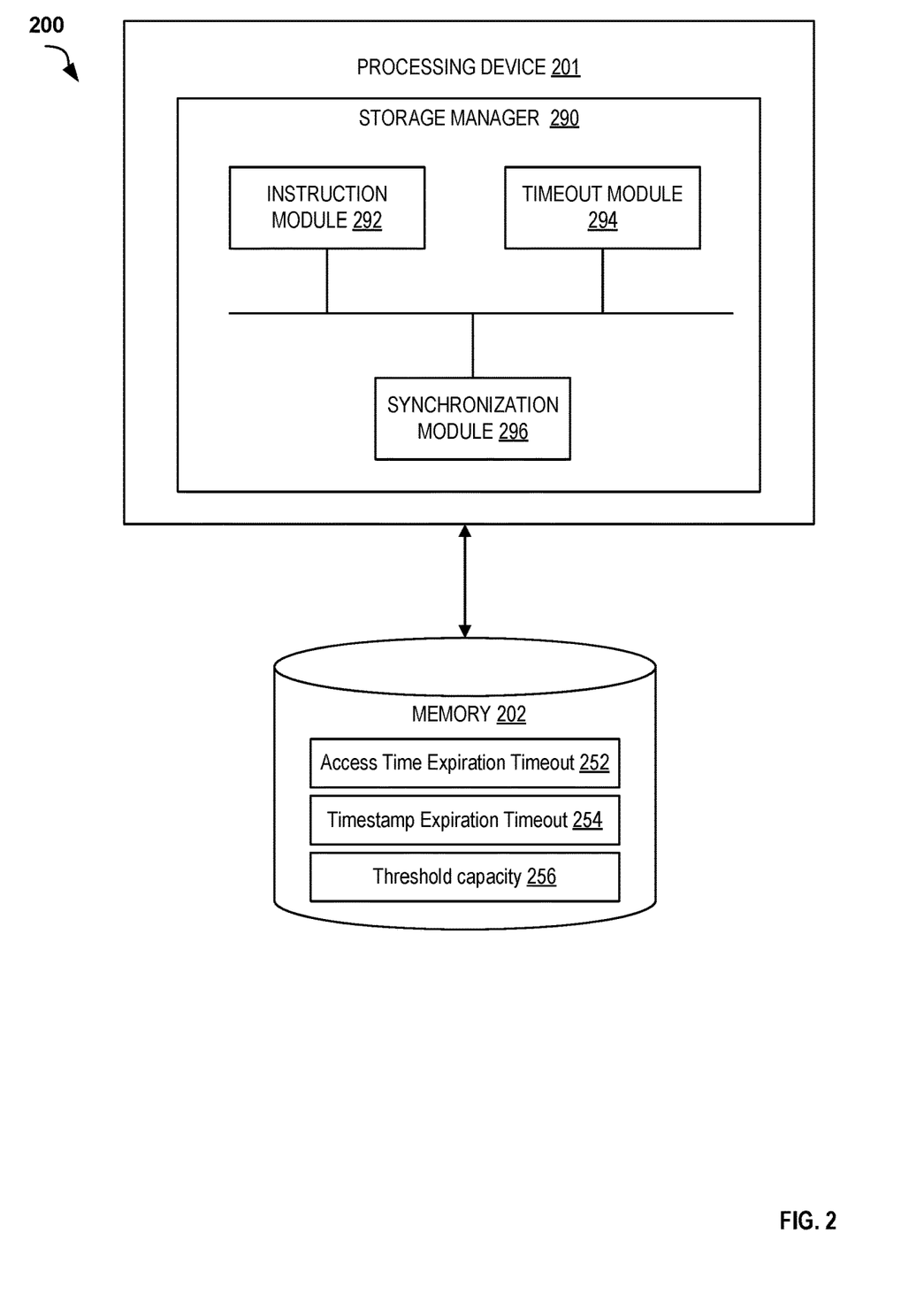
FIG. 2 depicts a block diagram illustrating a computer system operating in accordance with one or more aspects of the present disclosure.

FIG. 2 depicts a block diagram of a computer system 200 operating in accordance with one or more aspects of the present disclosure. Computer system 200 may perform the same functions as management server 108 of FIG. 1, and may include one or more processing device 201 and one or more memory devices 202. In the example shown, the processing device 201 of computer system 200 may include a storage manager 290. Storage manager 290 may perform the same functions as storage manager 190 of FIG. 1.

Storage manager 290 may include an instruction module 292, a timeout module 294, and a synchronization module 296. The instruction module 292 may enable the processing device 201 to receive an instruction to mount a storage device in a cloud computing environment. The timeout module 294 may enable the processing device 201 to modify and/or disable the synchronization timeout values associated with the storage device. The synchronization timeout values may be stored in memory 202, specifically in access time expiration timeout 252 and timestamp expiration timeout 254. Access time expiration timeout 252 and timestamp expiration timeout 254 may store one or more timeout values, each one associated with a corresponding mounted storage device. The synchronization module 296 may enable the processing device 201 to implement a synchronization between volatile memory and non-volatile memory, e.g., in view of the synchronization timeout values.

The instruction module 292 can receive (or otherwise intercept) an instruction to mount a storage device. The instruction can be received from a client device, or it may be received from a cloud provider system. The instruction can include an indicator that indicates to the storage manager 290 the type of storage device to mount. The instruction module 292 can determine the type of storage device to mount based on the received instruction.

The timeout module 294 can modify the synchronization timeout values associated with the mounted storage device according to the instruction. In some embodiments, the timeout module 294 can set the synchronization timeout values for the timeouts associated with the storage device mounted. In embodiments, the timeout module 294 can set the access time expiration timeout 252 value to the highest possible setting. Alternatively, the timeout module 294 can disable the access time expiration timeout 252 value. In embodiments, the timeout module 294 can set the timestamp expiration timeout 252 value to the highest possible setting. Alternatively, the timeout module 294 can disable the timestamp expiration timeout 252 value.

The synchronization module 296 can execute the synchronization between the volatile memory of a host system and the non-volatile memory associated with the host system. That is, the synchronization module 296 can determine whether to store the dirty memory pages stored on the volatile memory device to the non-volatile memory based on the timeout values associated with the storage device. In some embodiments, the operations performed by the synchronization module 296 can be performed by the host system on which the storage device is mounted. In embodiments, the synchronization module 296 can store dirty volatile memory pages to non-volatile memory when the volatile memory device has reached a threshold capacity 256. For example, the threshold capacity 256 can be 80%. When the synchronization module 296 associated with a storage device determines that the dirty volatile memory has reached 80%, the synchronization module 296 can transmit a share (e.g., a percentage, or a predefined number of memory pages) of the volatile memory device to non-volatile memory to free up space on the volatile memory device.

Figure 3:
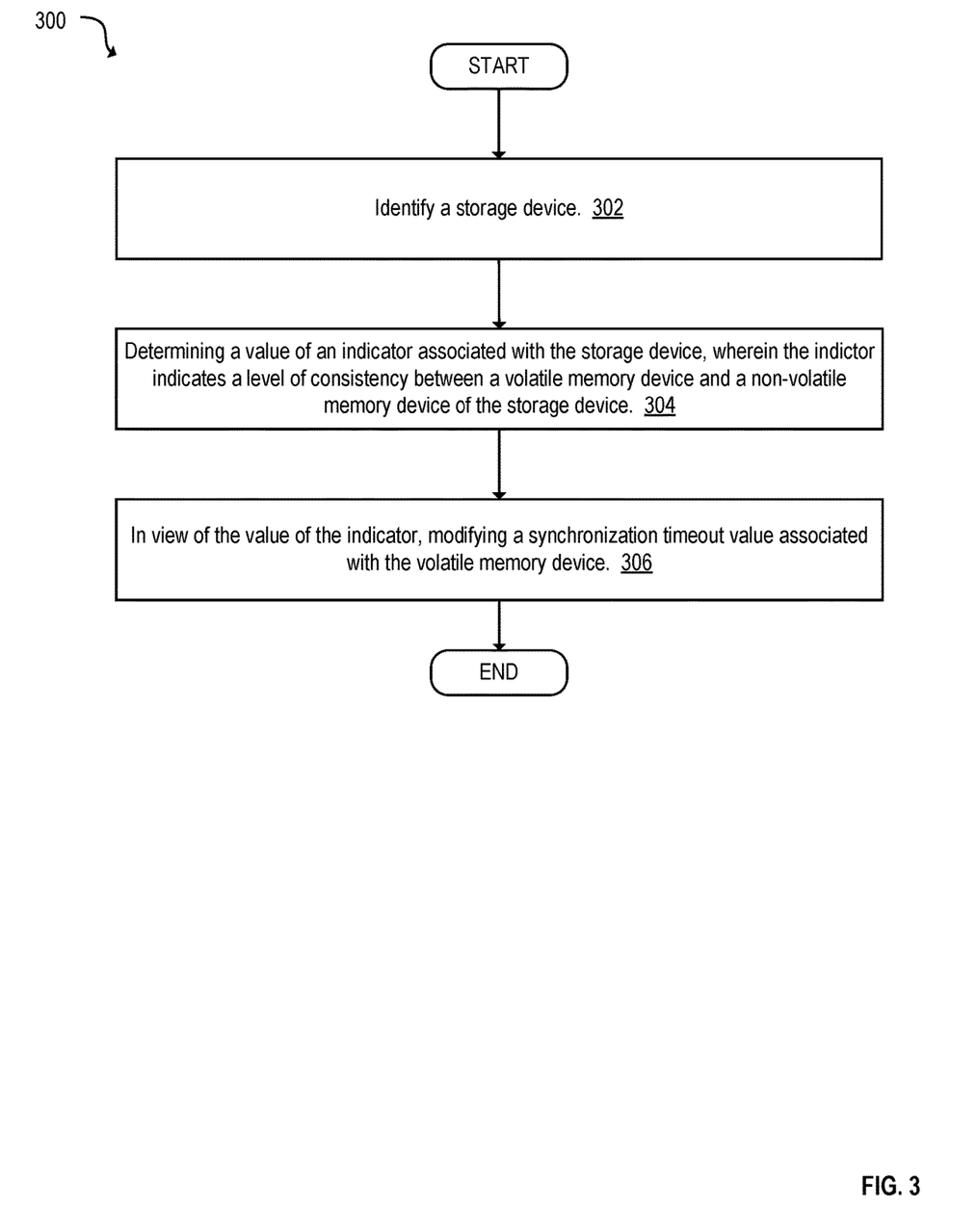
FIG. 3 is a flow diagram of an example method of providing efficient dirty page expiration, in accordance with one or more aspects of the present disclosure.

FIG. 3 depicts a flow diagram of an example method 300 for providing efficient dirty page expiration, in accordance with one or more aspects of the present disclosure. Method 300 may be performed by processing logic (e.g., in computer system 200 of FIG. 2) that may comprise hardware (e.g., circuitry, dedicated logic, programmable logic, microcode, etc.), software (such as instructions run on a processing device), firmware, or a combination thereof. Method 300 and each of its individual functions, routines, subroutines, or operations may be performed by one or more processors of the computer device executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). In one embodiment, method 300 may be performed by storage manager 190 as shown in FIG. 1.

For simplicity of explanation, the methods of this disclosure are depicted and described as a series of acts. However, acts in accordance with this disclosure can occur in various orders and/or concurrently, with other acts not presented and described herein. Furthermore, not all illustrated acts may be needed to implement the methods in accordance with the disclosed subject matter. In addition, it can be appreciated that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media.

At block 302, processing logic may identify a storage device. In some embodiments, the storage device can be mounted by a build container in a cloud execution environment. That is, a build container can send an instruction to the processing logic to mount a storage device.

At block 304, the processing logic may determine a value of an indicator associated with the storage device. The indicator indicates a level of consistency between a volatile memory device and the non-volatile memory in the storage device. In some embodiments, the indicator may be a 1-bit indicator that indicates whether consistency is required or not required. For example, if the indicator is set to "0," the processing logic can determine that consistency is required between the volatile memory and the non-volatile memory, whereas if the indicator is set to "1," the processing logic can determine that consistency is not required between the volatile memory and the non-volatile memory.

At block 306, in view of the value of the indicator, the processing logic may modify a synchronization timeout value associated with the volatile memory device. The synchronization timeout value indicates a rate at which to store one or more memory pages of the volatile memory device to the storage device. Hence, if the processing logic determines that the indicator indicates that consistency is not required between the volatile memory and the non-volatile memory, the processing logic can set synchronization timeout value accordingly.

In some embodiments, the processing logic can modify the synchronization timeout value by disabling the synchronization timeout associated with the volatile memory device. In some embodiments, the processing logic can modify the synchronization timeout value by setting the value of an access time expiration to a predefined value associated with the volatile memory device. The access time expiration value can determine the rate at which dirty memory pages are written to non-volatile memory. For example, a dirty volatile memory page can be written to the non-volatile memory device when the value of the access time expiration matches the elapsed time since the memory page was last accessed. In some embodiments, the processing logic can modify the synchronization timeout value by setting the value of a timestamp expiration to a predefined value associated with the volatile memory device. The timestamp expiration value can determine the rate at which dirty memory pages are written to non-volatile memory. For example, a dirty volatile memory page can be written to the non-volatile memory device at a time interval equal to the timestamp expiration value (e.g., every 5 minutes). The predefined value (for either or both of the access time expiration and the timestamp expiration) can be the maximum value possible for the data field storing the value. In another example, the predefined value can be a set number of seconds or minutes (e.g., 5 minutes, or 300 seconds).

In embodiments, the processing logic can determine that the volatile memory device has reached a threshold capacity. Responsive to making such a determination, the processing logic can store a share of the volatile memory device to the storage device. In this situation, the processing logic can disregard the synchronization timeout values in order to free space on the volatile memory device. The threshold capacity can be a certain percentage. For example, the processing logic can determine to store a share of the volatile memory device to the storage device if the volatile memory device reaches 90% capacity (i.e., is 90% full). The processing logic can determine to store a certain percentage of the volatile memory device to the non-volatile memory device (e.g., 50%), or to store a certain number of volatile memory pages to the non-volatile memory device.

Figure 4:
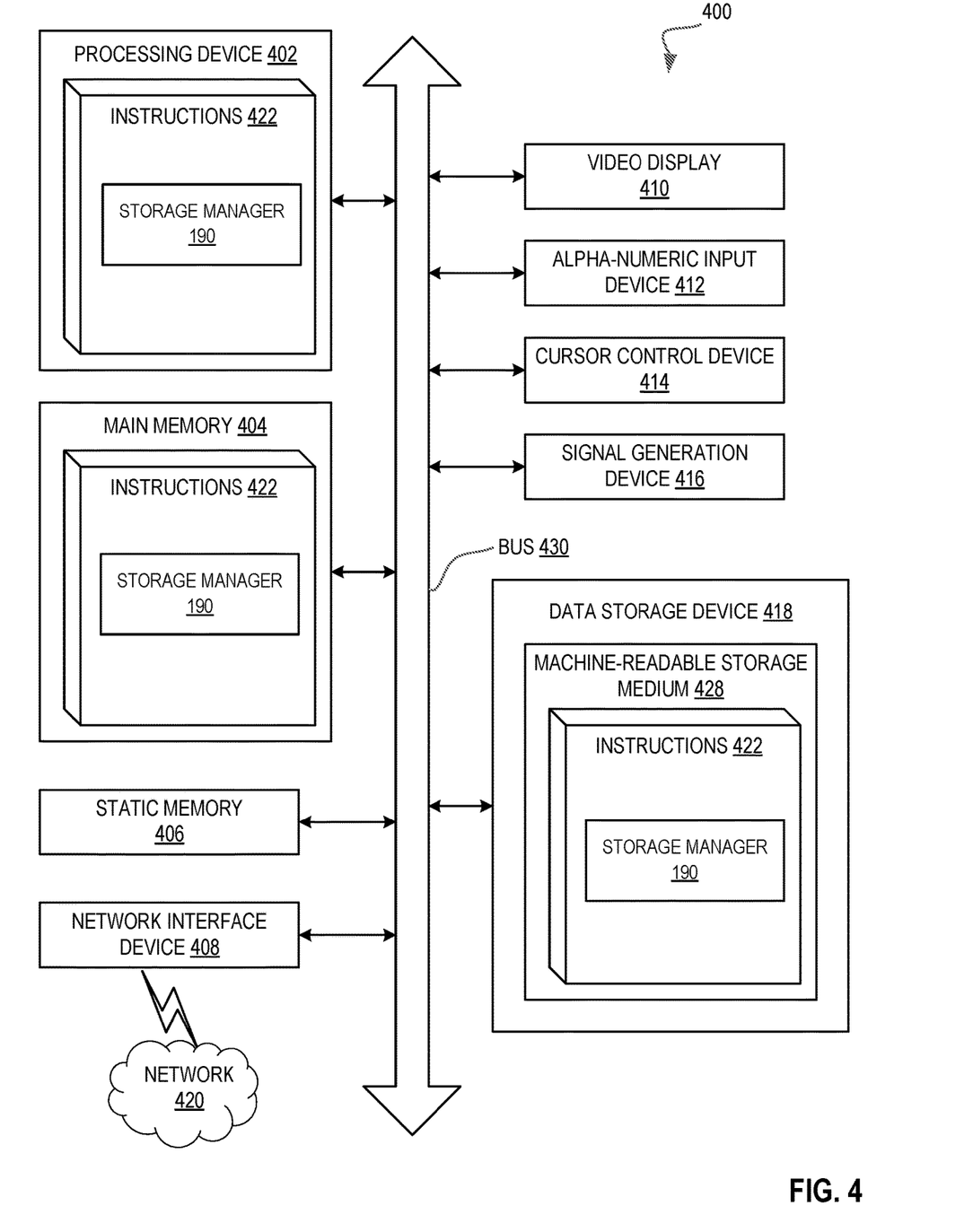
FIG. 4 depicts a block diagram of an illustrative computer system operating in accordance with one or more aspects of the present disclosure.

FIG. 4 is a diagrammatic representation of a machine in the exemplary form of a computer system 400 within which a set of instructions for causing the machine to perform any one or more of the methodologies discussed herein may be executed. In various illustrative examples, computer system 400 may correspond to computer system 200 of FIG. 2. Computer system 400 may be included within a data center that supports virtualization. Virtualization within a data center results in a physical system being virtualized using virtual machines to consolidate the data center infrastructure and increase operational efficiencies. A VM may be a program-based emulation of computer hardware resources associated with hard disks or other such memory. The VM may emulate a physical computing environment, but requests for a hard disk or memory may be managed by a virtualization layer of a host machine to translate these requests to the underlying physical computing hardware resources. This type of virtualization results in multiple VMs sharing physical resources.

In certain embodiments, computer system 400 may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. Computer system 400 may be provided by a personal computer (PC), a tablet PC, a set-top box (STB), a personal digital assistant (PDA), a cellular telephone, a web appliance, a server, a network router, switch or bridge, or any machine capable of executing a set of instructions (sequential or otherwise) that specify actions to be taken by that device. Further, while only a single machine is illustrated, the term "computer" shall also be taken to include any collection of computers that individually or jointly execute a set (or multiple sets) of instructions to perform any one or more of the methodologies discussed herein.

The example computer system 400 may include a processing device 402, a main memory 404 (e.g., read-only memory (ROM), flash memory, dynamic random access memory (DRAM) (such as synchronous DRAM (SDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, central processing unit, or the like. More particularly, the processing device may be complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets. Processing device 402 may also be one or more special-purpose processing devices such as an application specific integrated circuit (ASIC), a field programmable gate array (FPGA), a digital signal processor (DSP), network processor, or the like. Processing device 402 may be configured to execute storage manager 190 for programming the operations and steps discussed herein.

Computer system 400 may further include a network interface device 408. Computer system 400 may also include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

Data storage device 418 may include a machine-readable storage medium (or more specifically a computer-readable storage medium) 420 having one or more sets of instructions (e.g., the storage manager 190) embodying any one or more of the methodologies of functions described herein. The storage manager 190 may also reside, completely or at least partially, within main memory 404 and/or within processing device 402 during execution thereof by computer system 400; main memory 404 and processing device 402 also constituting machine-readable storage media. Storage manager 190 may further be transmitted or received over a network 426 via network interface device 408.

Machine-readable storage medium 420 may also be used to store the device queue manner logic persistently. While machine readable storage medium 420 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instruction for execution by the machine and that causes the machine to perform any one or more of the methodologies of the present disclosure. The term "machine-readable storage medium" shall accordingly be taken to include, but not limited to, solid-state memories, and optical and magnetic media.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed descriptions are presented in terms of methods and symbolic representations of operations on data bits within a computer memory. These descriptions and representations are the means used by those skilled in the data processing arts to most effectively convey the substance of their work to others skilled in the art. A method is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the above discussion, it is appreciated that throughout the description, discussions utilizing terms such as "enabling," "transmitting," "requesting," "identifying," "querying," "retrieving," "forwarding," "determining," "passing," "processing," "issuing," "measuring," "caching," "monitoring," mapping," "estimating," "calculating," "disabling," "detecting," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), erasable programmable ROMs (EPROMs), electrically erasable programmable ROMs (EEPROMs), magnetic or optical cards, flash memory devices including universal serial bus (USB) storage devices (e.g., USB key drives) or any type of media suitable for storing electronic instructions, each of which may be coupled to a computer system bus.

The methods and illustrative examples described herein are not inherently related to any particular computer or other apparatus. Various general purpose systems may be used with programs in accordance with the teachings herein or it may prove convenient to construct more specialized apparatus to perform the required method 200, and/or each of their individual functions, routines, subroutines or operations. Examples of the structure for a variety of these systems are set forth in the description above.

It is to be understood that the above description is intended to be illustrative, and not restrictive. Many other embodiments will be apparent to those of skill in the art upon reading and understanding the above description. Although the present disclosure has been described with reference to specific exemplary embodiments, it will be recognized that the disclosure is not limited to the embodiments described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A method comprising:
   identifying an instruction to mount a storage device, wherein the instruction comprises a consistency indicator, and wherein the storage device is associated with a build container for creating an application image in a cloud execution environment;

determining a value of the consistency indicator associated with the storage device, wherein the consistency indicator indicates a level of consistency between a volatile memory device and a non-volatile memory device of the storage device; and setting a plurality of synchronization timeout values associated with the volatile memory device, wherein the synchronization timeout values are based on the value of the consistency indicator, and wherein setting the plurality of synchronization timeout values comprises disabling at least one of the plurality of synchronization timeout values associated with the volatile memory device.

2. The method of claim 1, wherein a synchronization timeout value of the plurality of synchronization timeout values indicates a rate at which to store one of one or more memory pages of the volatile memory device to the non-volatile memory device.

3. The method of claim 1, wherein setting the plurality of synchronization timeout values comprises:

setting a value of an access time expiration to a predefined value associated with the volatile memory device, wherein a memory page of the volatile memory device is written to the non-volatile memory device when the value of the access time expiration matches an elapsed time since the memory page was last accessed.

4. The method of claim 1, wherein setting the plurality of synchronization timeout values comprises:

setting a value of a timestamp expiration to a predefined value associated with the volatile memory device, wherein a memory page of the volatile memory device is written to the non-volatile memory device at a time interval equal to the value of the timestamp expiration.

5. The method of claim 1, further comprising:

responsive to determining that the volatile memory device has reached a threshold capacity, storing a share of the volatile memory device to the non-volatile memory device.

6. The method of claim 1, wherein the storage device is mounted by the build container in the cloud execution environment.

7. A system comprising:

a memory; and a processing device operatively coupled to the memory, the processing device to:

identify an instruction to mount a storage device, wherein the instruction comprises a consistency indicator, and wherein the storage device is associated with a build container for creating an application image in a cloud execution environment;

determine a value of the consistency indicator associated with the storage device, wherein the consistency indicator indicates a level of consistency between a volatile memory device and a non-volatile memory device of the storage device; and set a plurality of synchronization timeout values associated with the volatile memory device, wherein the synchronization timeout values are based on the value of the consistency indicator, and wherein setting the plurality of synchronization timeout values comprises disabling at least one of the plurality of synchronization timeout values associated with the volatile memory device.

8. The system of claim 7, wherein a synchronization timeout value of the plurality of synchronization timeout values indicates a rate at which to store one of one or more memory pages of the volatile memory device to the non-volatile memory device.

9. The system of claim 7, wherein to set the plurality of synchronization timeout values comprises:

setting a value of an access time expiration to a predefined value associated with the volatile memory device.

10. The system of claim 7, wherein to set the plurality of synchronization timeout values comprises:

setting a value of a timestamp expiration to a predefined value associated with the volatile memory device.

11. The system of claim 7, wherein the processing device is further to:

responsive to determining that the volatile memory device has reached a threshold capacity, store a share of the volatile memory device to the non-volatile memory device.

12. A non-transitory computer-readable media storing instructions that, when executed, cause a processing device to perform operations comprising:

identifying an instruction to mount a storage device, wherein the instruction comprises a consistency indicator, and wherein the storage device is associated with a build container for creating an application image in a cloud execution environment;

determining a value of the consistency indicator associated with the storage device, wherein the consistency indicator indicates a level of consistency between a volatile memory device and a non-volatile memory device of the storage device; and setting a plurality of synchronization timeout values associated with the volatile memory device, wherein the plurality of synchronization timeout values are based on the value of the consistency indicator, and wherein setting the plurality of synchronization timeout values comprises disabling at least one of the plurality of synchronization timeout values associated with the volatile memory device.

13. The non-transitory computer-readable media of claim 12, wherein a synchronization timeout value of the plurality of synchronization timeout values indicates a rate at which to store one of one or more memory pages of the volatile memory device to the non-volatile memory device.

14. The non-transitory computer-readable media of claim 12, wherein setting the plurality of synchronization timeout values comprises:

setting a value of an access time expiration to a predefined value associated with the volatile memory device.

15. The non-transitory computer-readable media of claim 12, wherein setting the plurality of synchronization timeout values comprises:

setting a value of a timestamp expiration to a predefined value associated with the volatile memory device.

16. The non-transitory computer-readable media of claim 12, further comprising:

responsive to determining that the volatile memory device has reached a threshold capacity, storing a share of the volatile memory device to the non-volatile memory device.

17. The non-transitory computer-readable media of claim 12, wherein the storage device is mounted by the build container in the cloud execution environment.

18. The system of claim 7, wherein the storage device is mounted by the build container in the cloud execution environment.

* * * * *

UNITED STATES PATENT AND TRADEMARK OFFICE
CERTIFICATE OF CORRECTION

PATENT NO. : 12,045,474 B2  
APPLICATION NO. : 17/392031  
DATED : July 23, 2024  
INVENTOR(S) : Andrea Arcangeli et al.

Page 1 of 1

It is certified that error appears in the above-identified patent and that said Letters Patent is hereby corrected as shown below:

In the Specification

In Column 2, Line 24, please replace "by the Mode" with -- by the inode --.

Signed and Sealed this  
Twentieth Day of May, 2025

Coke Morgan Stewart  
*Acting Director of the United States Patent and Trademark Office*